United States Patent
Soehner et al.

(10) Patent No.: US 9,873,373 B2
(45) Date of Patent: Jan. 23, 2018

(54) BEAT COMPENSATION WITH AUTOMATIC HEADLIGHT SETTING

(71) Applicant: Dr. Ing. h.c. F. Porsche Aktiengesellschaft, Stuttgart (DE)

(72) Inventors: Sebastian Soehner, Karlsruhe (DE); Dominik Walter, Leinfelden-Echterdingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/494,568

(22) Filed: Apr. 24, 2017

(65) Prior Publication Data

US 2017/0305331 A1 Oct. 26, 2017

(30) Foreign Application Priority Data

Apr. 26, 2016 (DE) .................. 10 2016 107 724

(51) Int. Cl.
*B60Q 1/14* (2006.01)
*H05B 33/08* (2006.01)

(52) U.S. Cl.
CPC ....... *B60Q 1/1423* (2013.01); *H05B 33/0854* (2013.01); *B60Q 2300/056* (2013.01)

(58) Field of Classification Search
CPC ............ H05B 33/0815; H05B 33/0818; H05B 33/0851; H05B 39/047; H05B 41/2828; H05B 41/3927; G09G 3/2014; G09G 3/2018; G09G 2320/0633; Y02B 29/346; Y02B 70/126; Y01S 315/07

USPC .... 315/77, 82, 291, 294, 307, 308, 312, 360
See application file for complete search history.

(56) References Cited

U.S. PATENT DOCUMENTS

| | | | | |
|---|---|---|---|---|
| 6,531,835 B2 * | 3/2003 | Chen | .................. | H05B 41/2828 315/291 |
| 6,724,156 B2 * | 4/2004 | Fregoso | ............. | H05B 33/0803 315/247 |
| 7,888,890 B2 * | 2/2011 | Joos | .................... | H05B 33/0818 315/307 |

(Continued)

FOREIGN PATENT DOCUMENTS

DE      102013204916 A1    9/2014

*Primary Examiner* — Haissa Philogene
(74) *Attorney, Agent, or Firm* — Leydig, Voit & Mayer, Ltd.

(57) ABSTRACT

A method for regulating a brightness of a luminous unit includes regulating the luminous unit by a pulse width modulator which provides an electric current having a predefined current value Y at a start time t0; modulating the electric current to a predefined brightness value at the start time t0 with a frequency of switching pulses that is chosen depending on a predefined brightness value; and progressively reducing the current value of respective switching pulses of the pulse-width-modulated electric current to a current value Y' proceeding from a start time t0 until a target time t1. The current value Y' is chosen in such a way that the luminous unit is luminous with the predefined brightness value upon a permanent supply with an electric current corresponding to the current value Y'. The respective switching pulses of the electric current are lengthened in their duration until a continuous electric current arises.

10 Claims, 5 Drawing Sheets

(56) References Cited

U.S. PATENT DOCUMENTS 8,643,301 B2 *  2/2014  Kanamori .......... H05B 33/0815
                                                    315/291
2013/0119875 A1  5/2013  Dearborn et al.

* cited by examiner

BEAT COMPENSATION WITH AUTOMATIC HEADLIGHT SETTING

CROSS REFERENCE TO RELATED APPLICATIONS

This application claims benefit to German Patent Application No. DE 10 2016 107 724.0, filed Apr. 26, 2016, which is hereby incorporated by reference herein.

FIELD

The present invention relates to a method for regulating a brightness of a luminous unit, and to a lighting system.

BACKGROUND

Modern vehicles generally use LED headlights that are controlled by means of a power driver. In order to regulate or set an LED headlight in terms of its brightness, an electric current for supplying respective LEDs of the headlight is pulse-width-modulated by means of a power driver, i.e. decreased in phases, such that switching pulses arise in which the LEDs are switched on and switched off. As a result of respective LEDs of an LED headlight being alternately switched on and off at different frequencies, the impression of different brightness levels or different levels of dimming arises for a human observer. In this case, the power driver drives different LEDs of a respective LED headlight in a phase-offset manner in order to reduce a peak value of an electric current to be applied for supplying the LED headlight. Owing to the phase-offset driving of the LEDs, it can happen that upon an interaction with a technical observer, such as e.g. a camera, beat effects occur which lead to a functional impairment or, in the worst case, to a functional failure of systems which operate depending on sensor values determined by means of the technical observer. Particularly with the use of a camera for determining a bright-dark boundary for automatically setting an LED headlight, on account of beat effects, disturbing image effects can occur, such as dark bars, for example, which disturb a precise determination of the bright-dark boundary.

SUMMARY

In an embodiment, the present invention provides a method for regulating a brightness of a luminous unit. The method includes regulating the luminous unit by a pulse width modulator which provides an electric current having a predefined current value Y at a start time t0; modulating the electric current to a predefined brightness value at the start time t0 with a frequency of switching pulses that is chosen depending on a predefined brightness value; and progressively reducing the current value of respective switching pulses of the pulse-width-modulated electric current, the current value being provided at the start time t0, to a current value Y' proceeding from the start time t0 until a target time t1. The current value Y' is chosen in such a way that the luminous unit is luminous with the predefined brightness value upon a permanent supply with an electric current corresponding to the current value Y'. The respective switching pulses of the electric current, proceeding from the start time t0, are lengthened in their duration by a magnitude selected depending on the respective current value of a respective switching pulse until a continuous electric current arises.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a possibility of avoiding beat effects when an LED headlight is observed by a technical observer.

Consequently, a method for regulating a brightness of a luminous unit is described herein wherein the luminous unit is regulated by means of a pulse width modulator which provides an electric current having a predefined current value Y at a start time t0, wherein the electric current is modulated to a predefined brightness value at the start time t0 with a frequency of switching pulses that is chosen depending on a predefined brightness value, wherein a current value of respective switching pulses of the pulse-width-modulated electric current is reduced progressively to a current value Y' proceeding from the start time t0 until a target time t1, wherein the current value Y' is chosen in such a way that the luminous unit is luminous with the predefined brightness value upon a permanent supply with an electric current corresponding to the current value Y', and wherein the respective switching pulses of the electric current, proceeding from the start time t0, are lengthened in their duration by a magnitude selected depending on the respective current value of a respective switching pulse until a continuous electric current arises.

A method described herein serves in particular for regulating brightness of an LED headlight of a vehicle. To that end, embodiments of the invention provide for a pulse-width-modulated electric current having a predefined current value, i.e. a predefined current intensity, to be converted into a continuous electric current having a reduced current value by comparison with the predefined current value.

In the context of the invention presented, a pulse-width-modulated electric current can be understood to mean an electric current which is decreased in phases, thus giving rise to switching pulses with a spacing with respect to one another that is dependent on a frequency of a respective pulse width modulation.

In the context of the invention presented, a switching pulse can be understood to mean a region having an increased current value by comparison with a directly adjacent region.

In the context of the present invention, a progressive reduction of switching pulses can be understood to mean a reduction or decrease of a respective current value of respective switching pulses that grows continuously across temporally successive different switching pulses. In this case, the progressive reduction or decrease of the respective current value of respective switching pulses of a multiplicity of temporally successive switching pulses can be effected exponentially or linearly.

In order to convert a pulse-width-modulated electric current into a continuous electric current without a luminous unit that is supplied by the corresponding electric current changing in terms of its brightness for a human observer, an embodiment of the invention provides for a current value of respective switching pulses of the pulse-width-modulated electric current, i.e. a current value at respective non-decreased phases of a pulse-width-modulated signal, to be continuously reduced and at the same time for a duration of the respective switching pulses to be continuously lengthened until a permanent electric current arises. In this case, it is preferably provided that a magnitude by which the current value of respective switching pulses is reduced and a magnitude by which the duration of the respective switching pulses is increased are chosen such that a quantity of light of a respective switching pulse, which quantity of light is transmitted to the luminous unit, remains constant and the luminous unit emits a uniform luminosity. This means that a current integrated over the time or the duration of a switching pulse, i.e. the emitted power of a switching pulse, upon a reduction of a current value and simultaneous lengthening of the duration of a switching pulse, remains the same.

In one possible configuration of a method according to the invention, it is provided that a length of the time range between the start time t0 and the target time t1 is fixedly predefined, wherein a value by which the current value of a respective switching pulse is to be reduced is calculated depending on the length of said time range.

In order to define a magnitude for the reduction of a current value of a respective switching pulse, a time range available for switching from pulse-width-modulated operation to continuous-current operation can be used. For the case where the time range is fixedly predefined e.g. for technical reasons, the current value of respective switching pulses must be decreased by a value which corresponds to a proportion of the time range that is constituted by a respective switching pulse. This means that a difference between the current value Y at the start time t0 and the current value Y' at the target time t1 is calculated and divided by a fixedly predefined number of switching pulses in the time range between the start time t0 and the target time t1. The result can be used as decreased value or reduction value of respective switching pulses.

In a further possible configuration of a method described herein, it is provided that a duration of the time range between the start time t0 and the target time t1 is chosen depending on a difference between the current value Y and the current value Y'.

In order to dynamically determine a time range available for switching from pulse-width-modulated operation to operation with continuous energization, provision may be made for choosing the time range depending on a predefined decrease value by which a current value of respective switching pulses is reduced. This means that in order to approximate a current value Y of respective switching pulses to a predefined current value Y', and not to decrease the current value of the switching pulses excessively rapidly, such that the impression of a current decrease is avoided, the current values of the respective switching pulses are decreased by a predefined reduction value, and this is done until the current value Y' is reached. Correspondingly, a long time range is required for a large difference between a current value Y at the start time t0 and the current value Y' at the target time t1 and a correspondingly shorter time range is required for a small difference between the current value Y at the start time t0 and the current value Y' at the target time t1.

In a further possible configuration of a method described herein, it is provided that, as soon as the current value of the respective switching pulses corresponds to the current value Y', the luminous unit is supplied continuously with an electric current having the current value Y'.

In order to enable reliable switching to continuous-current operation, it is provided that, as soon as a current value Y' is reached, e.g. in the case of a small difference between the current value Y at the start time t0 and the current value Y' at the target time t1 and a predefined long time range available for switching, the electric current for supplying a respective luminous unit is made available continuously and with the current value Y'.

In a further possible configuration of a method described herein, it is provided that the current value of respective switching pulses of a number of switching pulses is reduced exponentially proceeding from the respective current value Y at the start time t0 to the current value Y' at the target time t1.

In order to reduce a large difference between a current value Y at the start time t0 and a current value Y' at the target time t1 in a predefined time range, it may be provided that the current value of respective switching pulses is reduced exponentially. It goes without saying that a linear reduction is also conceivable.

In a further possible configuration of a method described herein, it is provided that the luminous unit is set automatically depending on sensor values of a bright-dark boundary of the luminous unit that are determined by means of at least one camera.

Using a continuous electric current, i.e. a continuous current, for supplying a luminous unit, such as e.g. a headlight of a vehicle, with electrical energy, it is possible to avoid phase-by-phase driving of different LEDs of the luminous unit and the attendant occurrence of beat effects when the luminous unit is detected by means of a camera. As a result of the continuous supply with electrical energy, the luminous unit emits light continuously, such that each frame of a recording recorded at a predefined frame rate of e.g. 25 frames per second is illuminated with a comparable brightness by the luminous unit. Accordingly, beat effects, such as e.g. black bars, are avoided. By virtue of bright bars being avoided, a bright-dark boundary actually present between a region illuminated by the luminous unit and non-illuminated surroundings can be reliably identified as such and used for setting the luminous unit.

Furthermore, a lighting system is described herein that includes at least one luminous unit and a pulse width modulator for regulating a brightness of the at least one luminous unit by means of an electric current having a predefined current value Y, which electric current is to be provided at a start time t0, and a frequency of switching pulses that is chosen depending on a predefined brightness value of the at least one luminous unit, and comprising a compensation module configured to reduce a current value of respective switching pulses of the electric current continuously to a current value Y' proceeding from the start time t0 until a target time t1, wherein the current value Y' is chosen in such a way that the luminous unit is luminous with the predefined brightness value upon a continuous supply with an electric current corresponding to the current value Y', and wherein the compensation module is furthermore configured to lengthen the respective switching pulses of the electric current, proceeding from the start time t0, in their duration depending on the respective current value of a respective switching pulse until a continuous electric current arises. Such a lighting system serves in particular for carrying out a method described herein.

The compensation module provided according to embodiments of the invention may be e.g. a control unit which reads out a brightness value predefined by a drive unit and drives a power driver with a pulse width modulator in accordance with the method presented. This means that the compensation module calculates respective current values and time ranges for switching pulses in a time range between the start time t0 and the target time t1 and correspondingly drives the power driver.

In one possible configuration of the lighting system presented, it is provided that the at least one luminous unit forms at least one headlight of a vehicle.

Particularly in the case of LED headlights used in road traffic, continuous setting of a luminous region is required in order to avoid dazzling other road users. Using the lighting system presented, an LED headlight of a vehicle can be reliably and rapidly adapted to present conditions.

In a further possible configuration of the luminous unit presented, it is provided that the lighting system comprises at least one camera for detecting a bright-dark boundary of the at least one headlight, and wherein the at least one headlight is set automatically depending on sensor values determined by the at least one camera.

By virtue of the use of a camera for automatically setting a headlight, the headlight can be rapidly and reliably adapted to present conditions.

Figure 1:
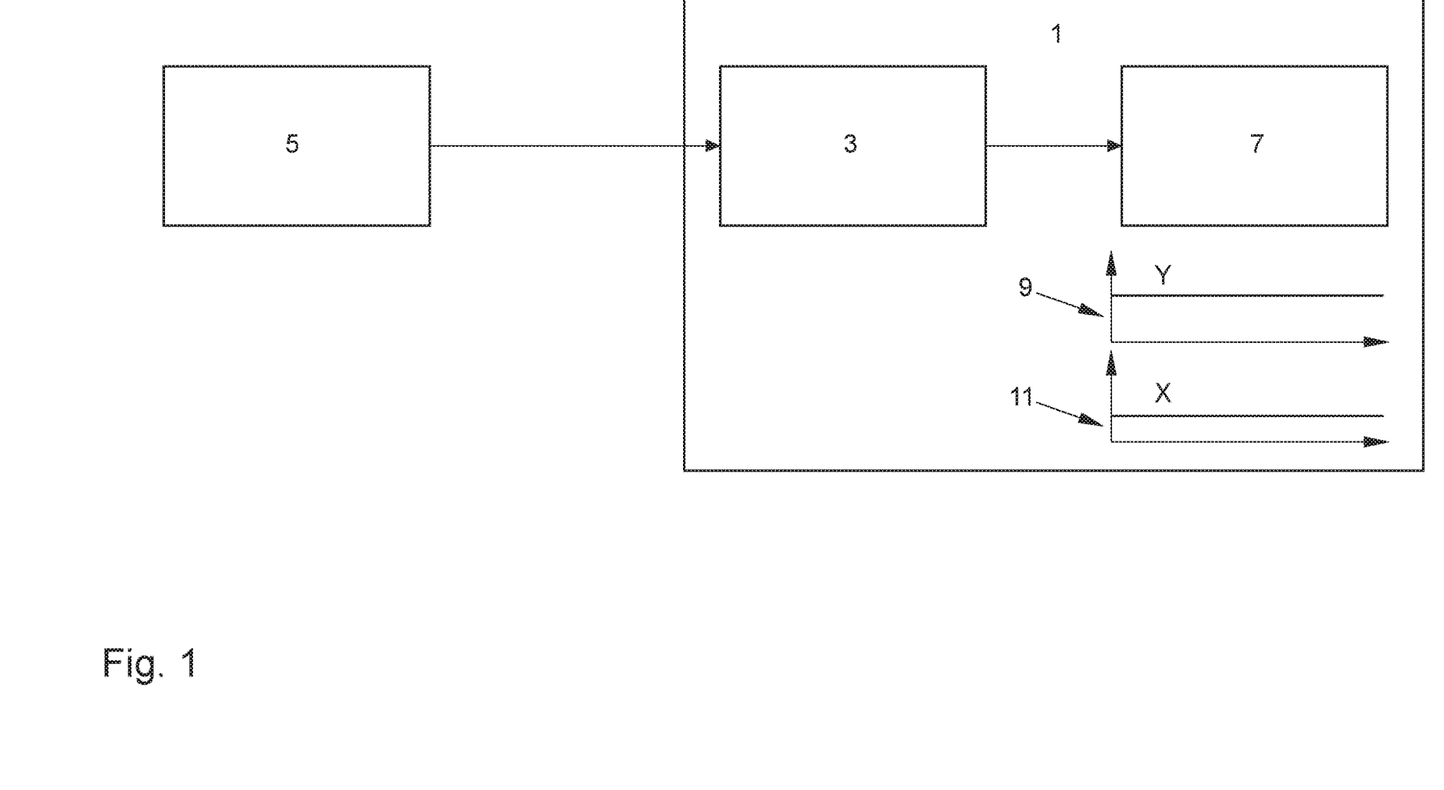
FIG. 1 shows a schematic illustration of a headlight dimmed by means of pulse width modulation in accordance with the prior art.

FIG. 1 illustrates a headlight 1 comprising a power driver 3 for converting brightness values predefined by a drive unit 5 in a light module 7 of the headlight 1. The light module 7 consists of a multiplicity of LEDs that are driven in a phase-offset manner in order to reduce a peak value of an electric current required for supplying the LEDs.

In order to set or reduce a brightness of the LEDs of the light module 7, an electric current for supplying the LEDs with electrical energy is modulated by means of a pulse width modulator, i.e. is switched on and off at a frequency chosen depending on a predefined brightness value, such that a brightness impression reduced by comparison with a basic value arises for an observer of the LEDs. To that end, by way of example, a predefined current value Y, such as is illustrated in diagram 9, in the case of a dimming value X of 50%, such as is illustrated in diagram 11, is provided in a time interval Δt, i.e. switched on and off, sufficiently often that the LEDs are supplied with electric current for 50% of the time interval. In this case, the current value Y of the electric current provided for the LEDs is constant during respective switch-on phases, as illustrated in diagram 9. Diagram 9 extends over a current value on the ordinate and over time on the abscissa, whereas diagram 11 extends over a dimming value on the ordinate and over time on the abscissa.

Figure 2:
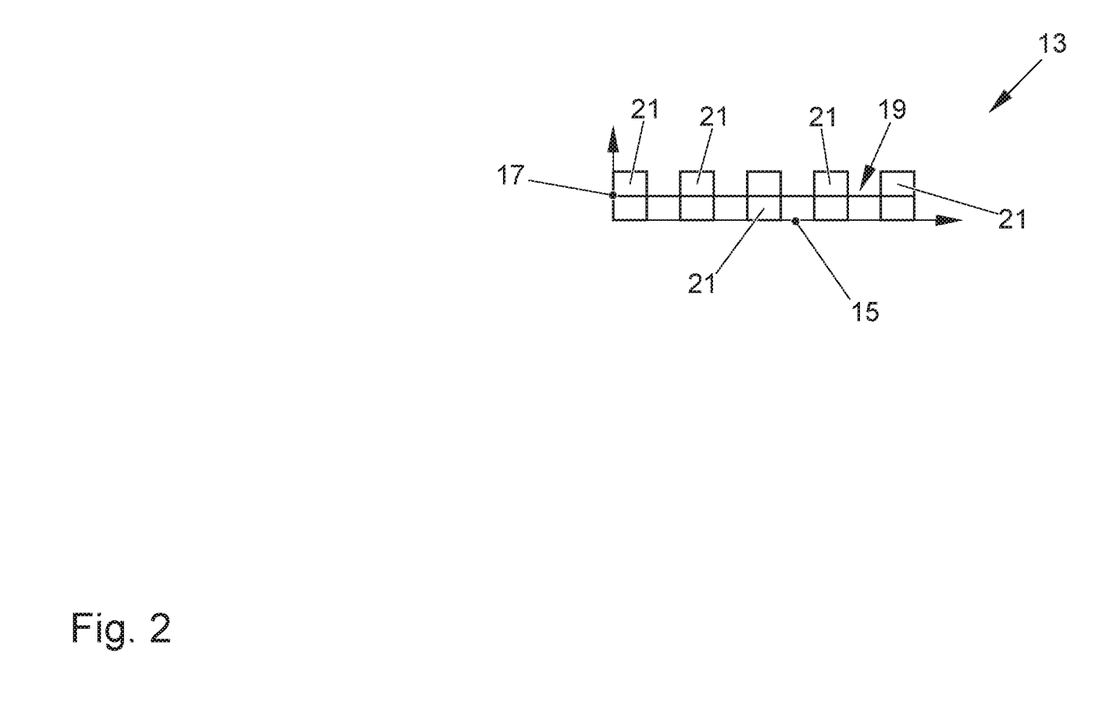
FIG. 2 shows a detailed view of a pulse width modulation scheme for setting a brightness of a headlight in accordance with FIG. 1.

FIG. 2 illustrates a pulse width modulation scheme for energizing the LEDs of the light module 7 from FIG. 1 in the case of a dimming value of 50%. In a diagram 13 extending over time on the abscissa 15 and over a current value [in amperes] on the ordinate 17, a line 19 representing a brightness impression perceived by an observer is depicted for illustration purposes. While the brightness impression of the observer remains constant, the electric current for supplying the LEDs with electric current is switched on and off regularly at high frequency, as represented by switching pulses 21. The switching pulses 21 are switched with a constant current value, i.e. a constant amperage, and supply the LEDs with electric current in 50% of a predefined time interval. This means that the LEDs flicker at the frequency of the switching pulses 21. This flicker is not visible to a human being, but for technical applications, such as e.g. a recording by means of a camera which is likewise operated at a predefined frequency, such as e.g. a recording of 25 frames per second, may lead to undesired beats that are in turn detrimental to a quality of technical applications, such as e.g. of an automatic image recognition algorithm that analyzes a light generated by a headlight.

Figure 3:
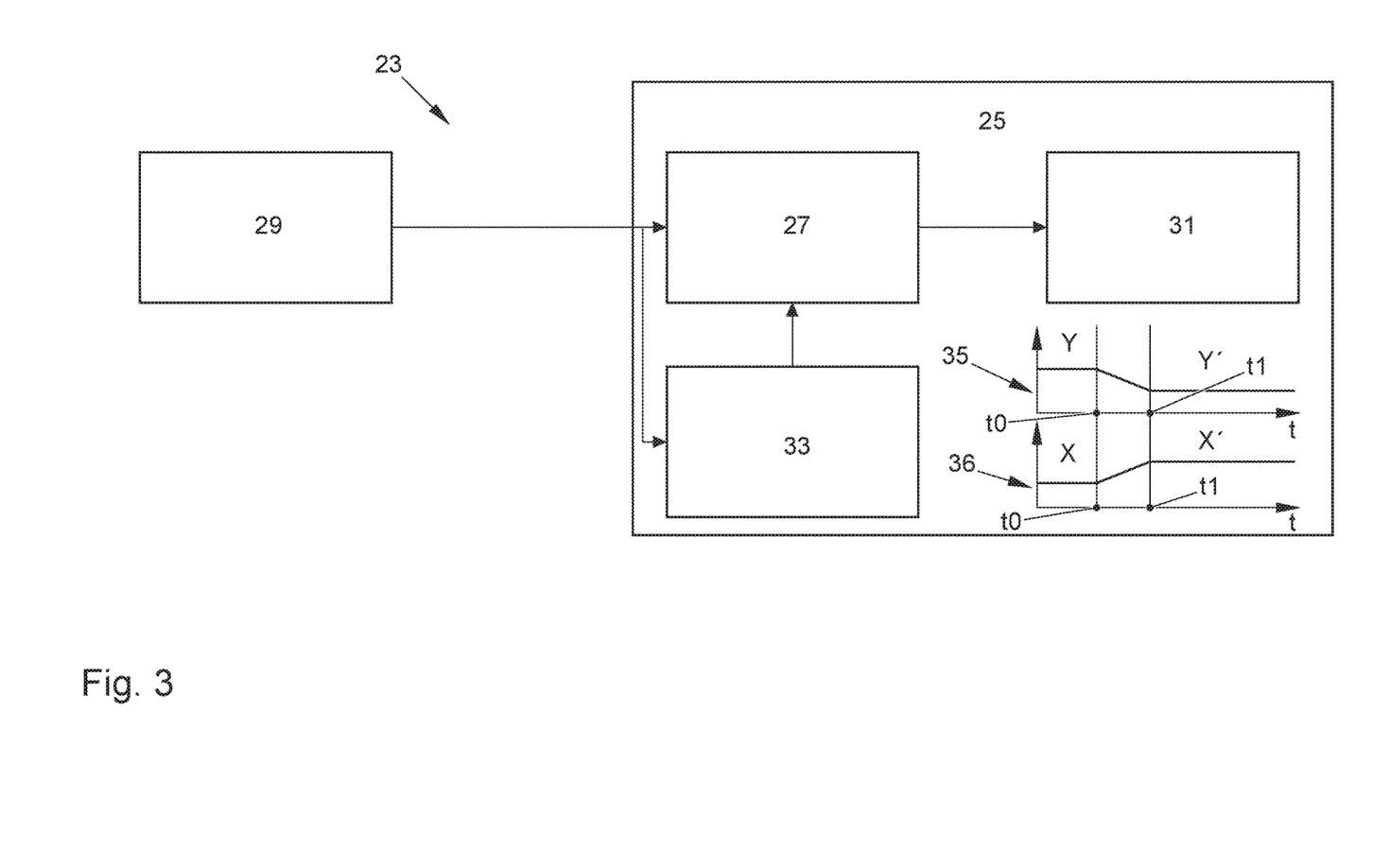
FIG. 3 shows a schematic illustration of one possible configuration of a method according to an embodiment of the invention.

FIG. 3 illustrates one possible configuration of the lighting system 23 presented, which comprises a luminous unit in the form of a headlight 25, which in turn comprises a power driver 27 for converting a brightness value predefined by the drive unit 29, e.g. via a CAN bus, or a corresponding dimming value increase into a pulse width modulation scheme used for regulating electric current to be provided for a light module 31 having a multiplicity of LEDs.

The power driver 27 is regulated by means of a compensation module 33 in such a way that for the case where a dimming value X is predefined by the drive unit 29, a corresponding pulse width modulation scheme is adapted or reduced progressively from a current value Y at the start time t0 to a current value Y' at the target time t1, as illustrated in diagram 35. In this case, a dimming value X at the start time t0 is simultaneously adapted to a dimming value X' of 100%, as illustrated in a diagram 36. In the case of a dimming value X' of 100%, the pulse-width-based dimming function is deactivated since a continuous energization, i.e. a permanent supply with electric current, takes place. This means that the electric current for supplying the LEDs is no longer pulse-width-modulated starting from a target time t1 at which the dimming value is 100%.

In order to comply with the brightness value predefined by the drive unit 29 despite the lack of pulse width modulation at the target time t1, provision is made for a current value, i.e. a current intensity for supplying the LEDs with electrical energy, to be adapted to the brightness value predefined by the drive unit 29 and to be e.g. at the target time t1, in the case of a dimming value of 100% at the target time t1, 50% of the current value at the start time t0. In this case, it is provided that, as soon as a present current value corresponds to a current value Y' at the target time t1, the corresponding electric current is provided continuously, i.e. in a non-modulated fashion. This means that the reduction of the brightness value of the headlight is firstly effected by a pulse width modulation, but the pulse width modulation is gradually approximated to a current value that enables operation of the headlight with the predefined brightness value, and, as soon as the current value that enables operation of the headlight with the predefined brightness value is reached, the pulse width modulation is replaced by a continuous electric current.

In order that a transition of the current value from the start time t0 to the target time t1 is made imperceptible to an observer, provision is made for continuously reducing a current value of a switching pulse of a pulse width modulation scheme or of a pulse width modulation signal in a temporal interval from a start time t0 until a target time t1, which can be fixedly predefined or chosen depending on a difference between current value Y at the start time t0 and current value Y' at the target time t1. In this case, provision is made for lengthening a duration of the respective switching pulse in a manner corresponding to a reduction of the current value. This means that respective switching pulses always provide an identical quantity of light for energizing the LEDs during a transition phase between the start time t0 and the target time t1, a magnitude of the current value decreasing as the number of implemented switching pulses advances and a duration of the switching pulses correspondingly increasing as the number of implemented switching pulses advances, until a continuous current supply is finally attained. As a result of the increasing duration of respective switching pulses, the spacing of the switching pulses with respect to one another decreases until said switching pulses form a uniform electric current.

Figure 4:
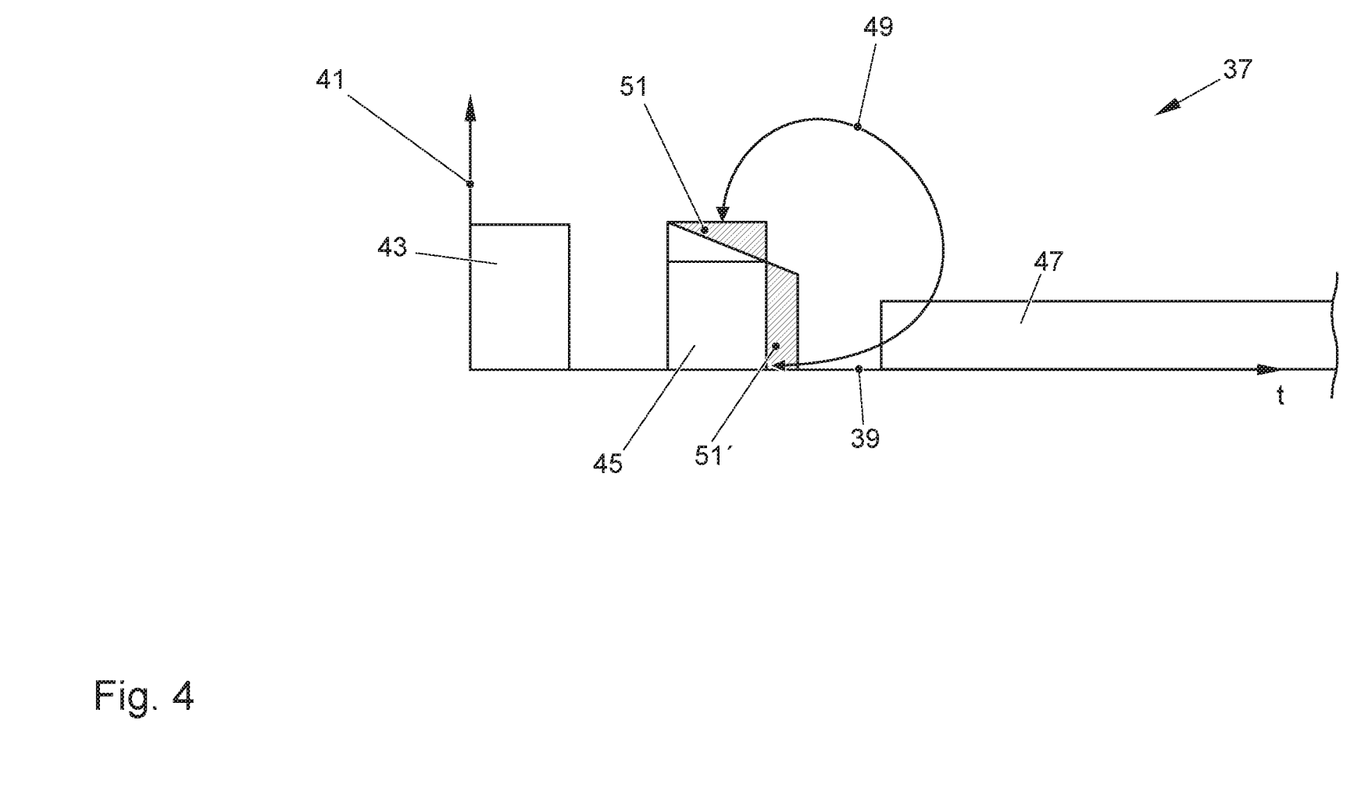
FIG. 4 shows a detailed view of a pulse width modulation scheme for setting a brightness of a headlight in accordance with a method according to an embodiment of the invention.

FIG. 4 schematically illustrates a detail view of the change of the pulse width modulation scheme in accordance with FIG. 3. Switching pulses 43, 45 and 47 of a pulse width modulation signal are illustrated in a diagram 37 extending over time on the abscissa 39 and over a current value [in amperes] on the ordinate 41. The switching pulse 43 corresponds to a dimming value X of 50%, in the case of which the light module 31 is switched on and operated with a current value Y for 50% of a respective time window. In order to adapt the current value Y to a current value Y', the current value Y is reduced progressively across the switching pulses 45 and 47 and a duration of the switching pulses 45 and 47 is correspondingly lengthened, such that the light module 31 is operated in a switched-on manner in the case of switching pulse 45 with a value of greater than 50% and less than 100% of a respective time window. In this case, the switching pulse is temporally lengthened and a current value of the switching pulse 45 is reduced, such that an area of the switching pulse 45 or a corresponding quantity of light remains constant, as indicated by arrow 49 and the displaced region 51 and 51', respectively. This means that the current value Y' at the target time t1 corresponds to 50% of the current value Y at the start time t0, but the switching pulse was converted into a constant current 47, i.e. the current value Y' is present for 100% of the time. The quantity of light of the switching pulse 43 corresponds to the quantity of light of the switching pulse 45, the lower current value of the switching pulse 45 being provided across a larger time range than the current value of the switching pulse 43. In this case, a provided power of the switching pulse 43 and a provided power of the switching pulse 45 are identical. During the driving by means of the switching pulses 43 and 45, the light module 31 generates a constant operative brightness for a human observer.

Figure 5:
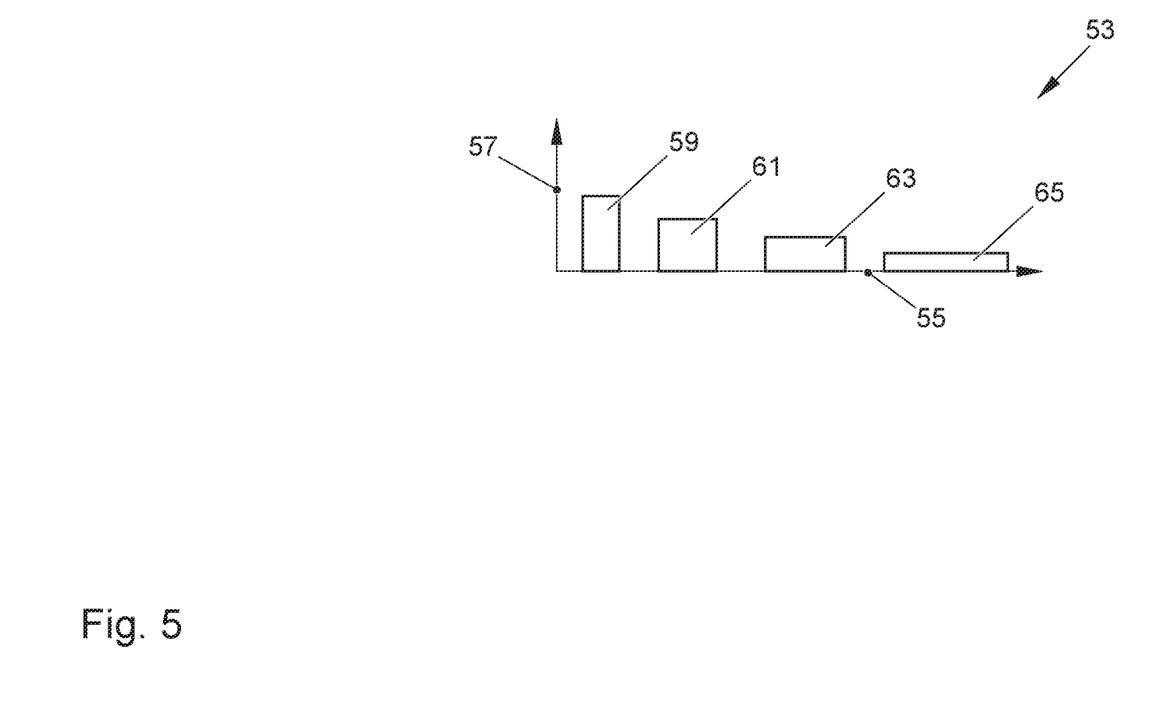
FIG. 5 shows a further detailed view of a pulse width modulation scheme for setting a brightness of a headlight in accordance with a method according to a further embodiment of the invention.

FIG. 5 illustrates a further switching scheme for switching from a pulse-width-modulated signal to a constant, i.e. a direct-current, signal. Switching pulses 59, 61, 63 and 65 are illustrated in a diagram 53 extending over time on the abscissa 55 and over a current value [in amperes] on the ordinate 57. Proceeding from a current value Y of the switching pulse 59 at the start time t0, the current value of the switching pulse 61 is reduced and the switching pulse is correspondingly lengthened. The current value of the switching pulse 63 is once again reduced and correspondingly lengthened, such that the switching pulse 65 whose current value was reduced once again is identical to a current value required for a continuous energization of respective LEDs of a headlight, which continuous energization leads to a brightness impression for an observer of the headlight which corresponds to a brightness impression at a start time t0.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for regulating a brightness of a luminous unit, the method comprising:
   regulating the luminous unit by a pulse width modulator which provides an electric current having a predefined current value Y at a start time t0,
   modulating the electric current to a predefined brightness value at the start time t0 with a frequency of switching pulses that is chosen depending on a predefined brightness value, and
   progressively reducing the current value of respective switching pulses of the pulse-width-modulated electric current, the current value being provided at the start time t0, to a current value Y' proceeding from the start time t0 until a target time t1,
   wherein the current value Y' is chosen in such a way that the luminous unit is luminous with the predefined brightness value upon a permanent supply with an electric current corresponding to the current value Y', and
   wherein the respective switching pulses of the electric current, proceeding from the start time t0, are lengthened in their duration by a magnitude selected depending on the respective current value of a respective switching pulse until a continuous electric current arises.

2. The method as claimed in claim 1, wherein a duration of a time range between the start time t0 and the target time t1 is fixedly predefined, and
   wherein a value by which the current value of a respective switching pulse is to be progressively reduced is calculated depending on the duration of the time range.

3. The method as claimed in claim 1, wherein a duration of a time range between the start time t0 and the target time t1 is chosen depending on a difference between the current value Y and the current value Y'.

4. The method as claimed in claim 1, wherein, as soon as the current value of the respective switching pulses corresponds to the current value Y', the luminous unit is supplied continuously with an electric current having the current value Y'.

5. The method as claimed in claim 1, wherein the current value of respective switching pulses of a number of switching pulses is reduced exponentially proceeding from the current value Y at the start time t0 to the current value Y' at the target time t1.

6. The method as claimed in claim 1, wherein the current value of respective switching pulses of a number of switching pulses is reduced linearly proceeding from the current value Y at the start time t0 to the current value Y' at the target time t1.

7. The method as claimed in claim 1, wherein the luminous unit is set automatically depending on sensor values of a bright-dark boundary of the luminous unit that are determined by at least one camera.

8. A lighting system comprising:
at least one luminous unit;
a pulse width modulator configured to regulate a brightness of the at least one luminous unit by way of an electric current having a predefined current value Y, which electric current is to be provided at a start time t0, and a frequency of switching pulses that is chosen depending on a predefined brightness value of the at least one luminous unit; and
a compensation module configured to reduce a current value of respective switching pulses of the electric current continuously to a current value Y' proceeding from the start time t0 until a target time t1, wherein the current value Y' is chosen in such a way that the luminous unit is luminous with the predefined brightness value upon a continuous supply with an electric current corresponding to the current value Y',
wherein the compensation module is further configured to lengthen the respective switching pulses of the electric current, proceeding from the start time t0, in their duration depending on the respective current value of a respective switching pulse until a continuous electric current arises.

9. The lighting system as claimed in claim 8, wherein the at least one luminous unit forms at least one headlight of a vehicle.

10. The lighting system as claimed in claim 9, wherein the lighting system comprises at least one camera for detecting a bright-dark boundary of the at least one headlight, and
wherein the at least one headlight is set automatically depending on sensor values determined by the at least one camera.

* * * * *